United States Patent
Shen et al.

(10) Patent No.: US 11,423,225 B2
(45) Date of Patent: Aug. 23, 2022

(54) ON-DEVICE LIGHTWEIGHT NATURAL LANGUAGE UNDERSTANDING (NLU) CONTINUAL LEARNING

(71) Applicant: Samsung Electronics Co., Ltd., Suwon-si (KR)

(72) Inventors: Yilin Shen, Santa Clara, CA (US); Xiangyu Zeng, Sunnyvale, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 16/946,746

(22) Filed: Jul. 2, 2020

(65) Prior Publication Data
US 2021/0004532 A1   Jan. 7, 2021

Related U.S. Application Data

(60) Provisional application No. 62/870,625, filed on Jul. 3, 2019.

(51) Int. Cl.
*G10L 15/16* (2006.01)
*G06F 40/30* (2020.01)
*G06N 3/04* (2006.01)
*G06F 40/279* (2020.01)

(52) U.S. Cl.
CPC .................................. *G06F 40/279* (2020.01)

(58) Field of Classification Search
CPC ....... G10L 15/06; G10L 15/063; G10L 15/16; G10L 15/18; G10L 15/1815; G10L 15/183; G10L 2015/0635; G06F 40/279; G06F 40/284; G06F 40/30; G06N 3/08; G06N 5/02; G06N 20/00; G06N 3/02; G06N 3/04

USPC ................. 704/1, 9, 232; 706/16, 20, 59, 60
See application file for complete search history.

(56) References Cited

U.S. PATENT DOCUMENTS

| | | | |
|---|---|---|---|
| 9,190,055 B1 * | 11/2015 | Kiss .......................... | G10L 15/07 |
| 11,087,739 B1 * | 8/2021 | Rastrow ................ | G10L 15/063 |
| 11,094,317 B2 * | 8/2021 | Shen ........................ | G06F 40/30 |
| 2019/0034795 A1 * | 1/2019 | Zitouni ............... | G10L 15/1815 |
| 2019/0180736 A1 * | 6/2019 | Barton .................. | G10L 15/183 |
| 2019/0332668 A1 * | 10/2019 | Wang ...................... | G06F 40/30 |

(Continued)

OTHER PUBLICATIONS

Li et al., "Learning without Forgetting," IEEE Transactions on Pattern Analysis and Machine Intelligence, vol. 40, Issue 12, Feb. 2017, 13 pages.

(Continued)

*Primary Examiner* — Martin Lerner

(57) ABSTRACT

A method includes obtaining, using at least one processor of an electronic device, a base model trained to perform natural language understanding. The method also includes generating, using the at least one processor, a first model expansion based on knowledge from the base model. The method further includes training, using the at least one processor, the first model expansion based on first utterances without modifying parameters of the base model. The method also includes receiving, using the at least one processor, an additional utterance from a user. In addition, the method includes determining, using the at least one processor, a meaning of the additional utterance using the base model and the first model expansion.

20 Claims, 7 Drawing Sheets

(56) References Cited

U.S. PATENT DOCUMENTS

| | | | | |
|---|---|---|---|---|
| 2019/0362020 A1* | 11/2019 | Paulus | .................... | G06F 40/30 |
| 2020/0043480 A1* | 2/2020 | Shen | ........................ | G06F 40/30 |
| 2020/0193330 A1* | 6/2020 | Averboch | ............... | G06N 20/00 |
| 2020/0312301 A1* | 10/2020 | Polovets | ............... | G10L 15/063 |
| 2020/0334539 A1* | 10/2020 | Wang | ....................... | G06F 40/30 |
| 2020/0372395 A1* | 11/2020 | Mahmud | ................ | G06N 20/00 |
| 2020/0410365 A1* | 12/2020 | Cheung | .................. | G06N 3/063 |
| 2021/0142164 A1* | 5/2021 | Liu | ......................... | G06F 40/30 |

OTHER PUBLICATIONS

Liu et al., "Attention-Based Recurrent Neural Network Models for Joint Intent Detection and Slot Filling," Interspeech 2016, Sep. 2016, 5 pages.

* cited by examiner

ON-DEVICE LIGHTWEIGHT NATURAL LANGUAGE UNDERSTANDING (NLU) CONTINUAL LEARNING

CROSS-REFERENCE TO RELATED APPLICATION AND PRIORITY CLAIM

This application claims priority under 35 U.S.C. § 119(e) to U.S. Provisional Patent Application No. 62/870,625 filed on Jul. 3, 2019, which is hereby incorporated by reference in its entirety.

TECHNICAL FIELD

This disclosure relates generally to machine learning systems. More specifically, this disclosure relates to on-device lightweight natural language understanding (NLU) continual learning.

BACKGROUND

Natural language understanding (NLU) refers to technology that allows a computer or other machine to identify the proper meanings of humans' spoken or typed natural language utterances. Natural language understanding is being used in a growing number of applications, such as natural language digital assistants on users' mobile devices or in users' homes. Natural language understanding is often performed using machine learning systems that include trained NLU models. NLU models are typically trained offline using a large number of pre-processed natural language utterances as training data. While effective, training data typically cannot cover all possible varieties of utterances that will be received by a trained NLU model once the trained NLU model is actually placed into use.

SUMMARY

This disclosure provides on-device lightweight natural language understanding (NLU) continual learning.

In a first embodiment, a method includes obtaining, using at least one processor of an electronic device, a base model trained to perform natural language understanding. The method also includes generating, using the at least one processor, a first model expansion based on knowledge from the base model. The method further includes training, using the at least one processor, the first model expansion based on first utterances without modifying parameters of the base model. The method also includes receiving, using the at least one processor, an additional utterance from a user. In addition, the method includes determining, using the at least one processor, a meaning of the additional utterance using the base model and the first model expansion.

In a second embodiment, an electronic device includes at least one memory configured to store a base model trained to perform natural language understanding. The electronic device also includes at least one processor configured to generate a first model expansion based on knowledge from the base model, train the first model expansion based on first utterances without modifying parameters of the base model, receive an additional utterance from a user, and determine a meaning of the additional utterance using the base model and the first model expansion.

In a third embodiment, a non-transitory computer readable medium contains instructions that when executed cause at least one processor to obtain a base model trained to perform natural language understanding. The medium also contains instructions that when executed cause the at least one processor to generate a first model expansion based on knowledge from the base model and train the first model expansion based on first utterances without modifying parameters of the base model. The medium further contains instructions that when executed cause the at least one processor to receive an additional utterance from a user and determine a meaning of the additional utterance using the base model and the first model expansion.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
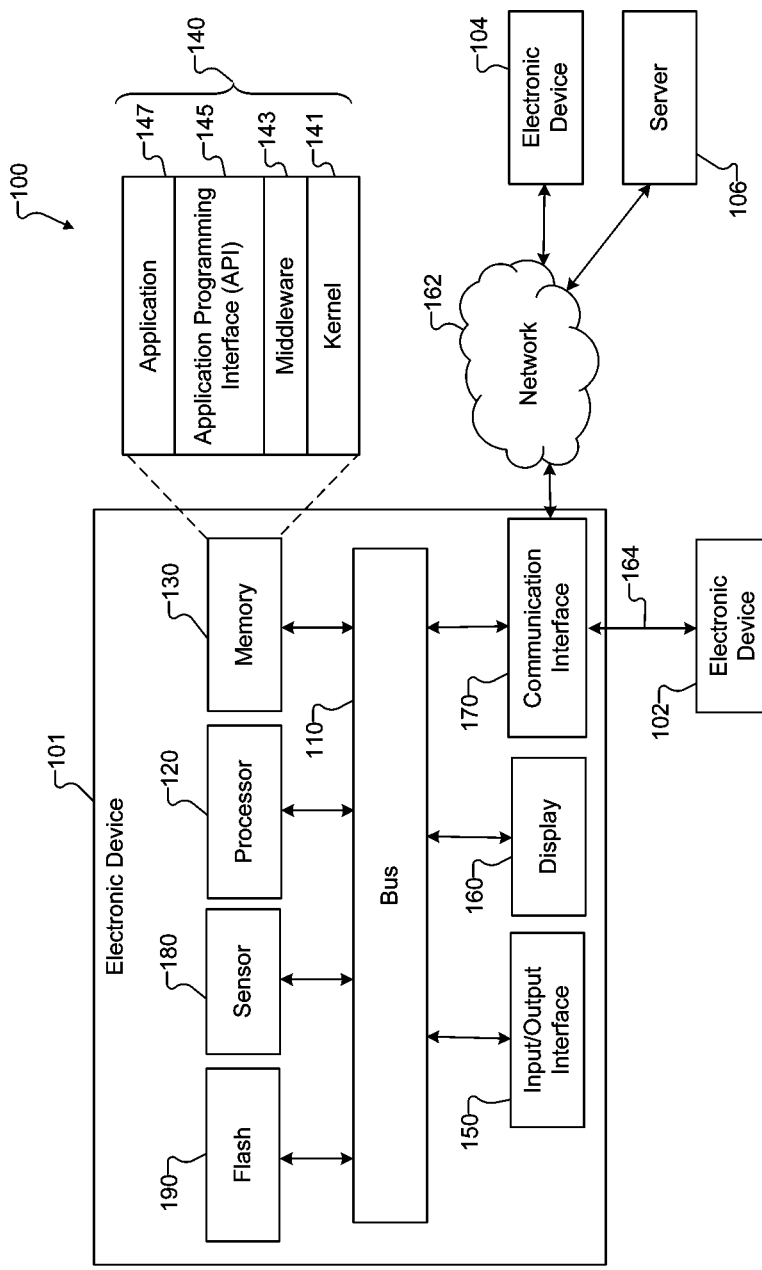
FIG. 1 illustrates an example network configuration including an electronic device in accordance with this disclosure.

FIGS. 1 through 8, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, natural language understanding (NLU) is being used in a growing number of applications, such as natural language digital assistants on users' mobile devices or in users' homes. Natural language understanding is often performed using machine learning systems that include trained NLU models. While NLU models can often be effectively trained offline using a large number of pre-processed natural language utterances as training data, training data typically cannot cover all possible varieties of utterances that will be received by a trained NLU model once the trained NLU model is actually placed into use. For example, different users typically have different personalized expressions, and new vocabulary and utterances for new user intents commonly arise after NLU model training (such as in response to recent or trending events).

Because of this, current NLU models that have been trained using original training data often need to be retrained, meaning the current NLU models often need to be replaced with new NLU models that have been trained using the original training data and additional training data. However, model training is typically a nontrivial task. For example, training an NLU model is often a time-consuming process and requires the use of powerful computers (such as one or more servers). Also, it can quickly become infeasible to repeatedly conduct NLU model training, particularly as the amount of training data grows over time. As a particular example, training an NLU model using tens of thousands of utterances as training data may take multiple hours to perform even using one or more servers. These issues make it infeasible to routinely train NLU models and make it virtually impossible to perform NLU model training on end-user devices (such as mobile smartphones) that are resource-constrained. While training an NLU model solely using the additional training data (without using the original training data) may seem like a viable option, this approach typically causes the NLU model to lose previously-learned capabilities, which is a problem often referred to as "catastrophic forgetting." Further, NLU model training is typically performed using servers or other powerful computers, and the resulting NLU models are then pushed to mobile devices or other end-user devices. However, recent privacy laws or other privacy-related concerns can interfere with or prevent NLU model retraining based on specific user-related information (such as personalized expressions) that have been collected from users' mobile devices or other end-user devices.

This disclosure provides various techniques that enable on-device lightweight NLU continual learning. As described in more detail below, a mobile device or other electronic device obtains an NLU base model, which has been trained to perform at least one natural language understanding task. The NLU base model is typically generated and trained by one or more servers or other components external to the electronic device. The electronic device itself is also able to generate and train one or more NLU model expansions over time, where each NLU model expansion can be used to learn knowledge that has not been learned by the NLU base model. For instance, each NLU model expansion can be trained to identify the meanings of words and the intents of utterances that were not learned by the NLU base model. In some cases, each NLU model expansion can be trained using training data that is collected by the electronic device and that is based on utterances previously provided by a user of the electronic device. In addition, the electronic device supports an expandable inference engine, which uses the NLU base model and any trained NLU model expansions to perform at least one natural language understanding task (such as identifying the meanings of words and the intents of utterances subsequently provided to the electronic device by a user). The inference engine here is "expandable" since the inference engine may initially use only the NLU base model to perform at least one natural language understanding task, but the inference engine may use more and more trained NLU model expansions over time (in addition to the NLU base model) to perform at least one natural language understanding task.

In this way, the knowledge of an NLU base model can be expanded using one or more NLU model expansions, and each NLU model expansion can be trained without modifying the NLU base model or any previous NLU model expansions. As a result, training can be performed to learn new knowledge for use in natural language understanding without losing previously-learned knowledge. Moreover, each NLU model expansion may typically be trained using a much smaller amount of training data (such as just to learn new personalized expressions, vocabulary, and/or user intents), so each NLU model expansion can be trained much more quickly and easily compared to retraining an NLU model based on all available training data. Because of this, the generation and training of the NLU model expansions is "lightweight" and can occur "on-device," meaning these operations can be performed on the electronic device being used by a user. This further helps comply with privacy laws or alleviate privacy concerns that some users may have, since data processing can be performed entirely on the users' own devices. Overall, these approaches help to provide continual learning capabilities for natural language understanding after an NLU base model is deployed, where learned knowledge can be updated for each individual user and learning can be performed on each user's own device. In addition, these techniques can greatly improve the user experience with NLU-based systems, such as "smart" digital assistants on mobile devices or in-home devices.

It should be noted here at the outset that the term "continual" and related terms do not require that a mobile device or other electronic device always be engaged in operations related to updating NLU-based knowledge. Rather, the term "continual" and related terms merely indicate that an electronic device has the capability to repeatedly generate and train NLU model expansions over time to improve the NLU-based knowledge used by the electronic device. The operations used to generate and train NLU model expansions can occur continuously, periodically, intermittently, on demand, or in any other suitable manner. Also, the NLU models and model expansions discussed below may be built using Recurrent Neural Networks (RNNs), Bidirectional Encoder Representations from Transformers (BERTs), and other type of deep neural network architectures.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, a sensor 180, and a flash 190. In some embodiments, the electronic device 101 may exclude at least one of these components or may add at least one other component. The bus 110 includes a circuit for connecting the components 120-190 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 can perform functions related to on-device lightweight NLU continual learning.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, perform functions related to on-device lightweight NLU continual learning. Examples of these functions can include obtaining an NLU base model that has been trained to perform at least one natural language understanding task, generating and training one or more NLU model expansions, and using the NLU base model and any NLU model expansions to perform the natural language understanding task(s). These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101. The one or more cameras or other imaging sensors 180 can optionally be used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-190 as the electronic device 101 (or a suitable subset thereof). The server 106 can support to drive the electronic device 101 by performing at least one of operations (or functions) implemented on the electronic device 101 or by performing operations supporting the electronic device 101. For example, the server 106 can include a processing module or processor(s) that may support the processor 120 implemented in the electronic device 101. In some embodiments, the server 106 may execute one or more applications that, among other things, generate one or more NLU base models that are trained to perform at least one natural language understanding task. The server 106 may also provide the one or more NLU base models for use by the electronic device 101 or other devices.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
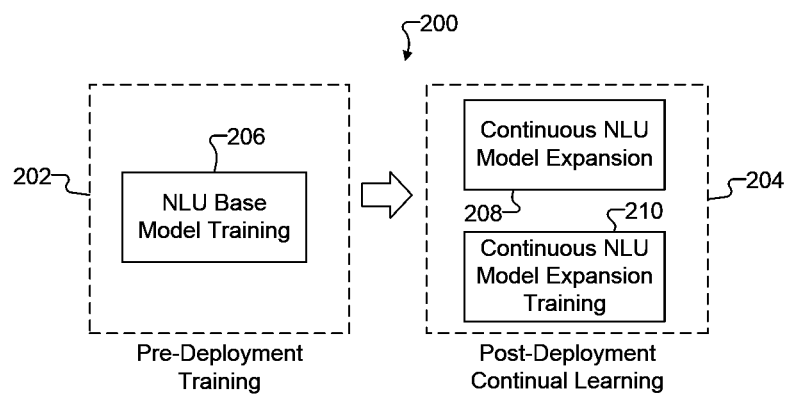
FIG. 2 illustrates an example approach for on-device lightweight natural language understanding (NLU) continual learning in accordance with this disclosure.

FIG. 2 illustrates an example approach 200 for on-device lightweight NLU continual learning in accordance with this disclosure. For ease of explanation, the approach 200 shown in FIG. 2 may be described as involving the use of the server 106 and the electronic device 101 in the network configuration 100 of FIG. 1. However, the approach 200 may involve the use of any suitable devices in any suitable systems.

As shown in FIG. 2, the approach 200 is generally divided into a pre-deployment training stage 202 and a post-deployment continual learning stage 204. The pre-deployment training stage 202 generally involves operations that are used to train an NLU base model. Once trained, the NLU base model can be deployed to one or more end-user devices (such as the electronic device 101) for use in performing one or more natural language tasks. The post-deployment continual learning stage 204 generally involves operations that are performed at the one or more end-user devices to supplement the NLU base model by generating and training one or more NLU model expansions. Note that while a single NLU base model and one or more NLU model expansions may be described below in relation to FIG. 2, the pre-deployment training stage 202 may be used to train any suitable number of NLU base models, and the post-deployment continual learning stage 204 may be used to generate and train any suitable number of NLU model expansions.

As shown here, the pre-deployment training stage 202 includes an NLU base model training operation 206. The training operation 206 is used to train an NLU base model, which refers to a machine learning model that has been trained to perform at least one NLU-related task. For example, the NLU base model may be trained to perform "slot filling" and "intent detection" operations. Slots refer to different parameters that may be included in input utterances being analyzed, and slot filling refers to identifying specific values for different slots based on the contents of the input utterances being analyzed. For instance, slots may refer to objects, locations, or times, and slot filling may be performed to identify the specific objects, locations, or times within the input utterances being analyzed. Intents refer to the overall meanings or purposes of the input utterances being analyzed. As a particular example of this, an input utterance of "Make a reservation at a nearby Italian restaurant in two hours" may be associated with a location slot (nearby), an object slot (Italian restaurant), and a time slot (two hours), and the intent of this user utterance can be determined to be "reserve item."

An NLU base model can be trained during the training operation 206 to recognize and fill different types of slots in input utterances and to recognize different intents of the input utterances. The training operation 206 here can use any suitable progressive learning technique to train the NLU base model. In some embodiments, for example, the training operation 206 has access to a large number of training utterances with ground truth labels, where the ground truth labels identify the correct slot fillings and the correct intents of the training utterances. The training utterances are provided to the NLU base model, which generates estimated slot fillings and estimated intents based on the training utterances. The estimated slot fillings and estimated intents are compared against the ground truth labels, and any differences between them are treated as errors (also referred to as losses). Parameters of the NLU base model (such as weights used in the NLU base model) can be adjusted in an attempt to reduce or minimize the losses between the estimated slot fillings/estimated intents as generated by the NLU base model and the ground truth labels. Typically, the training occurs until the losses are below some threshold value(s). At that point, the NLU base model is generally viewed as being suitably trained. Note that there are a wide variety of techniques for training machine learning models, and more techniques are sure to be developed in the future. This disclosure is not limited to use with any particular training technique for the NLU base model.

In some embodiments, the training operation 206 can be performed in a cloud-based environment, such as when the training operation 206 is performed using one or more computing devices (such as one or more servers 106) in a computing cloud. In other embodiments, the training operation 206 can be performed using at least one server 106 dedicated to training machine learning models, whether or not the at least one server 106 is part of a cloud-based environment. In general, any suitable device or devices may be used to perform the training operation 206.

As shown here, the post-deployment continual learning stage 204 includes a continuous NLU model expansion operation 208 and a continuous NLU model expansion training operation 210. The expansion operation 208 and the training operation 210 generally represent operations performed on each of one or more end-user devices that are using the trained NLU base model (such as the electronic device 101), where the operations 208 and 210 are used to supplement the knowledge of the trained NLU base model. The NLU model expansion operation 208 is used to generate at least one NLU model expansion, which represents a smaller machine learning model (relative to the NLU base model). Each NLU model expansion is used to capture knowledge related to user utterances (with additional slot fillings and intents) that cannot be interpreted by the NLU base model or that are not correctly interpreted by the NLU base model.

The NLU model expansion training operation 210 is used to train the at least one NLU model expansion on the end-user device. Again, each NLU model expansion can be trained during the training operation 210 to recognize and fill different types of slots in input utterances and to recognize different intents of the input utterances. The training operation 210 here can use any suitable technique to train an NLU model expansion. In some embodiments, for example, the NLU model expansion operation 208 can collect input utterances that cannot be interpreted by the NLU base model and/or input utterances that a user of the end-user device indicates are not correctly interpreted by the NLU base model, along with correct interpretations of those input utterances as provided by the user. The training operation 210 may use these input utterances to train the NLU model expansion, such as by minimizing losses between the estimated slot fillings/estimated intents generated by the NLU model expansion using the input utterances and the correct interpretations of those input utterances. Typically, the training occurs until the losses are below some threshold value(s). At that point, the NLU model expansion is generally viewed as being suitably trained and can be placed into use alongside the NLU base model. These operations 208 and 210 can be repeated any suitable number of times to produce any suitable number of NLU model expansions. Again, note that there are a wide variety of techniques for training machine learning models, and more techniques are sure to be developed in the future. This disclosure is not limited to use with any particular training technique for the NLU model expansions.

As noted above, the expansion operation 208 and the training operation 210 can be performed on an end-user device, such as when the operations 208 and 210 are performed using a user's electronic device 101. This enables the user's electronic device 101 to learn how to supplement an NLU base model with one or more NLU model expansions. As a result, NLU-related tasks that are performed on the electronic device 101 can be significantly improved over time while helping to protect the privacy of the user.

As described in more detail below, the first NLU model expansion generated by the user's electronic device 101 can be based on knowledge from the NLU base model, and each subsequent NLU model expansion generated by the user's electronic device 101 can be based on knowledge from the immediately-preceding NLU model expansion. For example, each NLU model expansion can be based on hidden states from the immediately-preceding NLU base model or the immediately-preceding NLU model expansion, which helps transfer knowledge to each NLU model expansion that is created and trained. Because of this, each NLU model expansion can be created and trained in order to update the NLU capabilities of the end-user device (such as by learning a particular user's new expressions and personalized vocabularies) in a lightweight and on-device manner without losing previously-learned knowledge. Thus, the electronic device 101 supports both (i) the learning of knowledge from the previously-trained NLU base model and any previously-trained NLU model expansions and (ii) the ability to essentially limit each new NLU model expansion to learning about input utterances not interpreted or not correctly interpreted by the previously-trained NLU base model and any previously-trained NLU model expansions.

Although FIG. 2 illustrates one example of an approach 200 for on-device lightweight NLU continual learning, various changes may be made to FIG. 2. For example, the training operation 206 may occur any number of times as needed or desired in order to generate any number of trained NLU base models. Also, the operations 208 and 210 may occur any number of times as needed or desired in order to generate any number of trained NLU model expansions.

Figure 3:
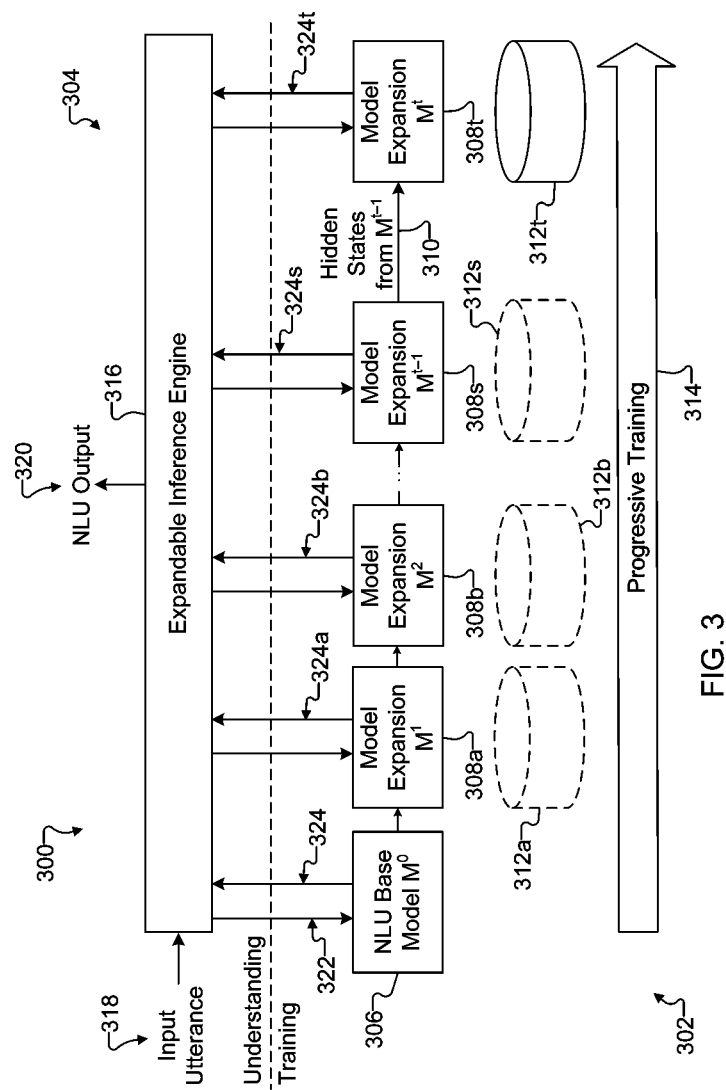
FIG. 3 illustrates an example technique for on-device lightweight NLU continual learning in accordance with this disclosure.

FIG. 3 illustrates an example technique 300 for on-device lightweight NLU continual learning in accordance with this disclosure. In particular, the technique 300 shown in FIG. 3 can be performed on an end-user device to support on-device lightweight NLU continual learning. For ease of explanation, the technique 300 shown in FIG. 3 may be described as involving the use of the electronic device 101 in the network configuration 100 of FIG. 1. However, the technique 300 may involve the use of any suitable devices in any suitable systems.

As shown in FIG. 3, the electronic device 101 generally supports a training mode of operation 302 and an understanding mode of operation 304. The training mode of operation 302 includes functions of the electronic device 101 that are used to produce one or more NLU model expansions in order to supplement NLU-based knowledge of the electronic device 101. Thus, the training mode of operation 302 in the electronic device 101 may include or support the operations 208 and 210 described above. The understanding mode of operation 304 includes functions of the electronic device 101 that are used to analyze and understand input utterances from a user using the NLU-based knowledge of the electronic device 101.

In this example of the training mode of operation 302, the electronic device 101 includes or has access to at least one NLU base model 306 (which may be denoted $M^0$). The NLU base model 306 may represent a base model that is trained as part of the training operation 206 in FIG. 2 and then deployed or otherwise provided to the electronic device 101. In many cases, the NLU base model 306 may be trained over a prolonged period of time using a large number of training utterances. As a result, the NLU base model 306 may encapsulate a large amount of knowledge related to at least one natural language understanding task. However, as with many trained NLU models, the NLU base model 306 cannot be trained to cover all possible varieties of utterances that will be received by the NLU base model 306 during use. Also, in many if not all cases, the electronic device 101 will not have access to or will not have the ability to use the original training data that was used to train the NLU base model 306. Among other reasons, this may be due to the size of the original training data and the limited memory capacity of the electronic device 101.

Over time, the electronic device 101 may recognize the need to produce and train or be instructed to produce and train one or more NLU model expansions 308a-308t (which may be denoted $M^1$ through $M^t$, respectively). Each NLU model expansion 308a-308t may typically be created and trained at a different time, so the NLU model expansions 308a-308t are typically generated sequentially. As described below, the NLU model expansion 308a can be based on knowledge from the NLU base model 306, and the NLU model expansion 308a can be trained without modifying parameters of the NLU base model 306. Each subsequent NLU model expansion 308b-308t can be based on knowledge from the immediately-preceding NLU model expansion 308a-308s, and each NLU model expansion 308b-308t can be trained without modifying parameters of the NLU base model 306 and without modifying parameters of any preceding NLU model expansion(s).

The NLU model expansions 308a-308t here expand the knowledge that is encapsulated in the NLU base model 306, thereby expanding the NLU capabilities of the electronic device 101. Each NLU model expansion 308a-308t here takes into account hidden states 310 that are produced by the immediately-preceding NLU base model 306 or by the immediately-preceding NLU model expansion. Thus, the NLU model expansion 308a takes into account the hidden states 310 produced by the NLU base model 306, and each of the NLU model expansions 308b-308t takes into account the hidden states 310 produced by the NLU model expansions 308a-308s, respectively. This allows each new NLU model expansion to be trained without requiring all previous training data to be available when training the NLU model expansion. Instead, training data 312a may be collected or otherwise obtained by the electronic device 101 and used to train the NLU model expansion 308a (without having access to the original training data used to train the NLU base model 306). Later, training data 312b may be collected or otherwise obtained by the electronic device 101 and used to train the NLU model expansion 308b (without having access to the original training data used to train the NLU base model 306 and without having access to the training data 312a). Training data 312s may be collected or otherwise obtained by the electronic device 101 and used to train the NLU model expansion 308s (without having access to any prior training data), and training data 312t may be collected or otherwise obtained by the electronic device 101 and used to train the NLU model expansion 308t (without having access to any prior training data). Overall, this supports a progressive training process 314 in which additional NLU-based knowledge can be captured through the sequential creation and training of the NLU model expansions 308a-308t without the need for constant storage and availability of all previously-used training data.

In this example of the understanding mode of operation 304, an expandable inference engine 316 is used to receive input utterances 318 and generate NLU-based outputs 320 associated with the input utterances 318. For example, the expandable inference engine 316 can generate, for each input utterance 318, an NLU-based output 320 that identifies one or more slot fillings for the input utterance 318 and an intent of the input utterance 318. The slot fillings and intents of the input utterances 318 are identified using the NLU base model 306 and any available NLU model expansions 308a-308t. For instance, the expandable inference engine 316 can provide an input utterance 318 (or information based on the input utterance 318) as an input 322 to each of the NLU base model 306 and any available NLU model expansions 308a-308t. Each of the NLU base model 306 and any available NLU model expansions 308a-308t can then provide an output 324, 324a-324t to the expandable inference engine 316, where each output 324, 324a-324t identifies estimated or predicted slot fillings (slot predictions) and an estimated or predicted intent (intent prediction) associated with the input utterance 318. The expandable inference engine 316 combines or otherwise uses the slot predictions and the intent predictions received from the NLU base model 306 and any available NLU model expansions 308a-308t in order to produce the final NLU-based output 320 for the input utterance 318.

The inference engine 316 here is referred to as being expandable since the inference engine 316 can generate the outputs 320 using an increasing number of NLU model expansions over time. For example, the inference engine 316 may initially provide an input 322 associated with each input utterance 318 being processed only to the NLU base model 306 and receive an output 324 associated with each input utterance 318 being processed only from the NLU base model 306. During this time, the output 320 for each processed input utterance 318 may be based solely on the output 324 produced by the NLU base model 306. At some point, the NLU model expansion 308a may be created and trained, and the inference engine 316 may provide inputs 322 associated with each input utterance 318 being processed to the NLU base model 306 and the NLU model expansion 308a and receive outputs 324, 324a associated with each input utterance 318 being processed from the NLU base model 306 and the NLU model expansion 308a. Thus, starting at this point, the output 320 for each processed input utterance 318 may be collectively based on the outputs 324, 324a from the NLU base model 306 and the NLU model expansion 308a. Later, at another point, the NLU model expansion 308b may be created and trained, and the inference engine 316 may provide inputs 322 associated with each input utterance 318 being processed to the NLU base model 306 and the NLU model expansions 308a-308b and receive outputs 324, 324a-324b associated with each input utterance 318 being processed from the NLU base model 306 and the NLU model expansions 308a-308b. Thus, starting at that point, the output 320 for each processed input utterance 318 may be collectively based on the outputs 324, 324a-324b from the NLU base model 306 and the NLU model expansions 308a-308b. This process can continue as more and more of the NLU model expansions are created and trained, enabling the inference engine 316 to expand the number of NLU model expansions in use.

As noted above, each NLU model expansion 308a-308t can be based on the hidden states 310 from the immediately-preceding NLU base model 306 (in the case of the NLU model expansion 308a) or from the immediately-preceding NLU model expansion (in the case of each NLU model expansion 308b-308t). As described in more detail below, the hidden states 310 of an NLU base model 306 or an NLU model expansion 308a-308t represent encodings generated within the NLU base model 306 or the NLU model expansion 308a-308t based on vector representations of words in an input utterance, which are contained in the input 322. These encodings are further processed within the NLU base model 306 or the NLU model expansion 308a-308t in order to produce slot and intent predictions, which are contained in the output 324, 324a-324t. As shown below, the encodings/hidden states 310 produced by the NLU base model 306 can be provided to the NLU model expansion 308a, and the encodings/hidden states 310 produced by the NLU model expansions 308a-308s can be provided to the NLU model expansions 308b-308t, respectively. As a result, each NLU model expansion 308a-308t can be based on the hidden states 310 from a single prior base model or model expansion (without modifying the parameters of the base model and any prior model expansions), and each NLU model expansion 308a-308t can be trained using a single set of training data 312a-312t.

The training data 312a-312t used to respectively train the NLU model expansions 308a-308t can be obtained by the electronic device 101 in any suitable manner. For example, in some instances, each set of training data 312a-312t can be collected by the electronic device 101 based on input utterances that either cannot be interpreted by the inference engine 316 or cannot be correctly interpreted by the inference engine 316 using the NLU base model 306 and any existing NLU model expansions 308a-308t. As a particular example, the electronic device 101 may include a user interface that can ask a user to explain an action or intent associated with an input utterance when the inference engine 316 cannot interpret the input utterance or when (based on user feedback) the inference engine 316 determines that an interpretation of the input utterance is incorrect. The user interface can collect data from the user and use that data to identify the ground truth label for the input utterance, and the input utterance and its ground truth label may then be used as part of a set of training data 312a-312t for use in training a new NLU model expansion 308a-308t. Note, however, that each set of training data 312a-312t may be obtained in any other suitable manner.

Although FIG. 3 illustrates one example of a technique 300 for on-device lightweight NLU continual learning, various changes may be made to FIG. 3. For example, the technique 300 may involve the use of any suitable number of NLU model expansions 308a-308t (and associated sets of training data), including a single NLU model expansion or numerous NLU model expansions.

Figure 4:
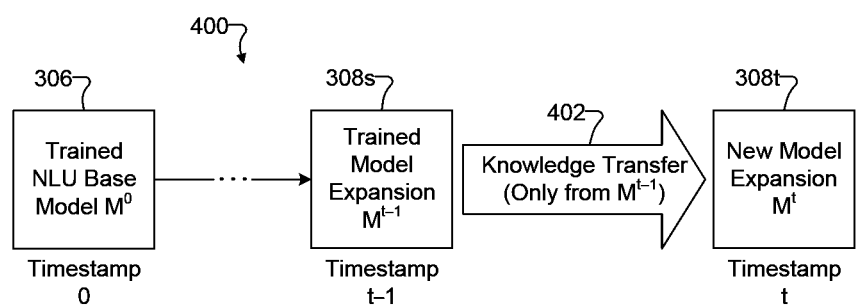
FIG. 4 illustrates an example NLU model expansion process to support on-device lightweight NLU continual learning in accordance with this disclosure.

FIG. 4 illustrates an example NLU model expansion process 400 to support on-device lightweight NLU continual learning in accordance with this disclosure. In particular, the NLU model expansion process 400 in FIG. 4 may be used as part of the progressive training process 314 in FIG. 3 to produce a new NLU model expansion. For ease of explanation, the NLU model expansion process 400 shown in FIG. 4 may be described as involving the use of the electronic device 101 in the network configuration 100 of FIG. 1. However, the NLU model expansion process 400 may involve the use of any suitable devices in any suitable systems.

As shown in FIG. 4, the NLU model expansions 308a-308t may be generated sequentially, and various timestamps are identified numerically in FIG. 4. The timestamps are meant to indicate that the NLU model expansions 308a-308t are created and trained at different times in a sequential manner. Thus, a new NLU model expansion can be produced and trained at each timestamp in order to sequentially expand the NLU-based knowledge of the electronic device 101.

Each NLU model expansion 308a-308t can be generated using knowledge transfer only from the immediately-preceding NLU base model 306 (in the case of the NLU model expansion 308a) or from the immediately-preceding NLU model expansion (in the case of each NLU model expansion 308b-308t). In the example shown in FIG. 4, a new NLU model expansion 308t is being produced based on knowledge transfer 402 from the immediately-preceding NLU model expansion 308s. This knowledge transfer 402 occurs by transferring the hidden states 310 produced within the NLU model expansion 308s to the NLU model expansion 308t. As a result, previously-learned knowledge from only the immediately-preceding base model or model expansion is transferred to each new model expansion. Because of this knowledge transfer, the new model expansion can remain small and can be trained on-device.

As noted above, during the creation and training of the new NLU model expansion 308t, parameters of the NLU base model 306 and parameters of all preceding NLU model expansions 308a-308s can remain fixed and not be changed. This helps preserve the knowledge learned by the NLU base model 306 and by the preceding NLU model expansions 308a-308s. Moreover, this can help simplify the training of the new NLU model expansion 308t since the new NLU model expansion 308t may have a relatively small number of parameters to be set during the training (as opposed to the collection of parameters of the NLU base model 306 and all preceding NLU model expansions 308a-308s).

As a simplified example of this learning process by knowledge transfer, assume that the NLU base model 306 is trained to understand the utterance "are there any restaurants?" For example, the NLU base model 306 can be trained to recognize the intent of this utterance as "find business" and to fill a "business type" slot for this utterance with "restaurant." During a subsequent process in which the NLU model expansion 308a is created and trained, the utterance "book a restaurant nearby" may be used as a training utterance. The NLU model expansion 308a can be trained to recognize the intent of this utterance as "reserve item" and to fill a "location" slot for this utterance with "nearby." However, the hidden state associated with "restaurant" can be transferred from the NLU base model 306 to the NLU model expansion 308a since the NLU base model 306 already understands the word "restaurant." During another subsequent process in which the NLU model expansion 308b is created and trained, the utterance "is there a book store nearby?" may be used as a training utterance. The NLU model expansion 308b can be trained to recognize the intent of this utterance as "find business" and to fill a "business type" slot for this utterance with "book store." However, the hidden state associated with "is there" can be transferred from the NLU model expansion 308a (which had this knowledge transferred from the NLU base model 306) to the NLU model expansion 308b since the NLU base model 306 already understands the phrase "are there," and the hidden state of "nearby" can be transferred from the NLU model expansion 308a to the NLU model expansion 308b since the NLU model expansion 308a already understands the word "nearby." The model structures shown in FIGS. 5A and 5B below illustrate how this knowledge transfer can be implemented or supported in the NLU base model 306 and the NLU model expansions 308a-308t. Once these NLU model expansions 308a and 308b are trained, the NLU model expansions 308a and 308b can be used along with the NLU base model 306 to make slot and intent predictions of additional input utterances.

Although FIG. 4 illustrates one example of an NLU model expansion process 400 to support on-device lightweight NLU continual learning, various changes may be made to FIG. 4. For example, there may be any suitable number of NLU model expansions based on the NLU base model 306. Also, note that the timestamps shown here are simply meant to illustrate the generation of NLU model expansions at different times. The NLU model expansions may be generated periodically, intermittently, on demand, or at any other suitable time(s).

Figure 5A:
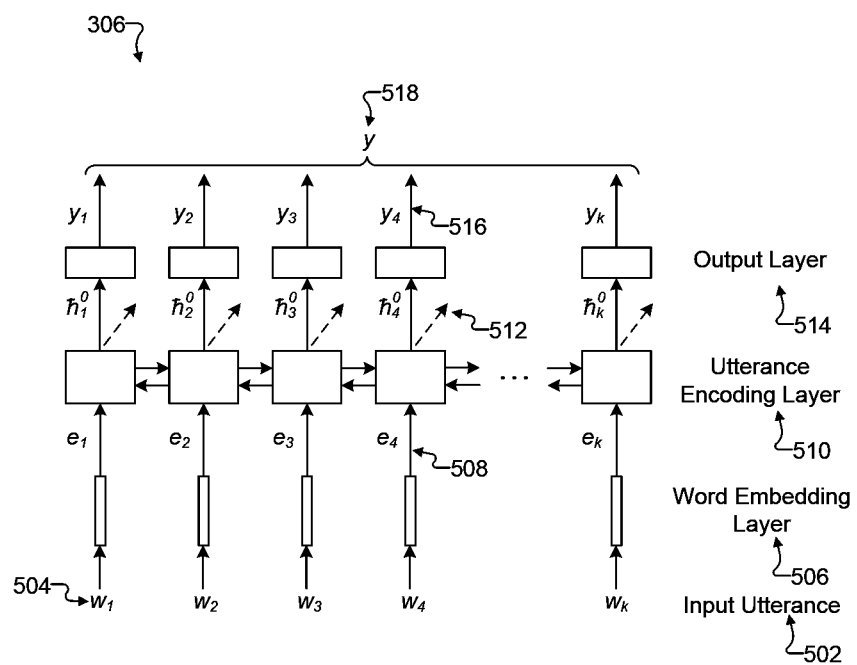
FIGS. 5A and 5B illustrate example machine learning models supporting on-device lightweight NLU continual learning in accordance with this disclosure.
Figure 5B:
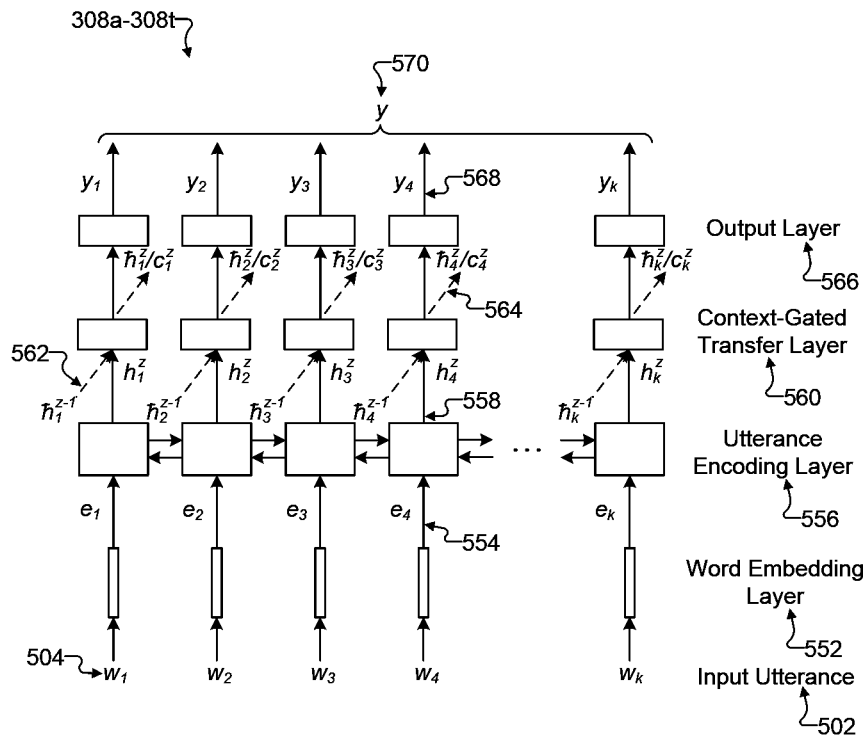

FIGS. 5A and 5B illustrate example machine learning models supporting on-device lightweight NLU continual learning in accordance with this disclosure. In particular, FIG. 5A illustrates an example structure of a machine learning model used as the NLU base model 306, and FIG. 5B illustrates an example structure of a machine learning model used as the NLU model expansions 308a-308t. For ease of explanation, the machine learning models shown in FIGS. 5A and 5B may be described as involving the use of the electronic device 101 in the network configuration 100 of FIG. 1. However, the machine learning models may involve the use of any suitable devices in any suitable systems.

As shown in FIG. 5A, the NLU base model 306 receives an input utterance 502, which includes one or more words 504. The input utterance 502 here may, for example, represent an input 322 received from the inference engine 316. In some embodiments, the NLU base model 306 may support the analysis of input utterances 502 having a specified maximum number of words 504, and the NLU base model 306 can process input utterances 502 having up to the maximum number of words 504. Each word 504 of the input utterance 502 is provided to a word embedding layer 506, which operates to convert each word 504 of the input utterance 502 into an embedding vector 508. The embedding vectors 508 represent dense vectors that are used to understand each individual word's semantic meaning. Each embedding vector 508 may have any suitable number of values, such as 256, 512, or 1024 values. In some embodiments, the embedding vectors 508 are generated using a word embedding matrix E, where $e_i$ denotes the $i^{th}$ row of the word embedding matrix E and each row in E corresponds to the embedding vector of a different word in a given vocabulary.

Each embedding vector 508 is provided to an utterance encoder layer 510. In some embodiments, multiple embedding vectors 508 can be provided to the utterance encoder layer 510 one-by-one based on their associated words' sequence in the input utterance 502. The utterance encoder layer 510 operates to convert each embedding vector 508 into an encoding or hidden state 512. In FIG. 5A, $h_i^0$ denotes the hidden state 512 for the $i^{th}$ word 504, where i=1, . . . , n and where the "0" superscript indicates the hidden state 512 are associated with $M^0$. The hidden states 512 represent the contextual meanings of the words 504 in the input utterance 502 and the semantic meaning of the whole utterance 502 (as defined by the accumulated contextual meanings of all words 504 in the utterance 502). Each hidden state 512 represents an internal fixed-length representation for the associated word 504 of the input utterance 502.

Each hidden state 512 is provided to an output layer 514. The output layer 514 uses the hidden states 512 to produce a slot prediction 516 for each word 504 of the input utterance 502 and an intent prediction 518 for the whole utterance 502, where $y_i$ denotes the slot prediction 516 for the $i^{th}$ word 504 and y denotes the intent prediction 518 for the utterance 502. For example, the output layer 514 may identify a slot prediction 516 for each word 504 of the input utterance 502 by determining whether each word 504 of the input utterance 502 is associated with a "business type" slot, a "business name" slot, a "location" slot, or a "time" slot (although these are merely examples of the types of slots that might be used). In some cases, the output layer 514 uses a softmax function to map unnormalized slot predictions to a probability distribution, where the probability distribution represents the probability of a word 504 of the input utterance 502 being mapped to each of multiple possible slots. As another example, the output layer 514 may identify an intent prediction 518 for the input utterance 502 by identifying whether the input utterance 502 is associated with a "find business" intent or a "reserve item" intent (although these are merely examples of the types of intents that might be used). In some cases, the output layer 514 again uses a softmax function to map unnormalized intent predictions to a probability distribution, where the probability distribution represents the probability of an input utterance 502 being mapped to each of multiple possible intents.

As shown in FIG. 5B, each NLU model expansion 308a-308t similarly receives the input utterance 502, which includes the one or more words 504. Each word 504 of the input utterance 502 is provided to a word embedding layer 552, which operates to convert each word 504 of the input utterance 502 into an embedding vector 554. Each embedding vector 554 is provided to an utterance encoder layer 556, and multiple embedding vectors 554 may be provided to the utterance encoder layer 556 one-by-one based on their associated words' sequence in the input utterance 502. The utterance encoder layer 556 operates to convert each embedding vector 554 into an initial encoding or hidden state 558, where $h_i^z$ denotes the initial hidden state 558 for the $i^{th}$ word 504 (i=1, . . . , n). Here, the "z" superscript represents the timestamp associated with the model structure shown in FIG. 5B (meaning z=1, . . . , t in FIG. 4). The hidden states 558 represent the contextual meanings of the words 504 in the input utterance 502 and the semantic meaning of the whole utterance 502. These components may be the same as or similar to the corresponding components in FIG. 5A.

The initial hidden states 558 are provided to a context-gated transfer layer 560, which also receives hidden states 562 from the immediately-preceding NLU base model 306 (in the case of the NLU model expansion 308a) or from the immediately-preceding NLU model expansion (in the case of each NLU model expansion 308b-308t). The context-gated transfer layer 560 operates to generate concatenations 564 of modified hidden states (produced by combining the hidden states 558 and 562) and context vectors (produced based on the modified hidden states). In FIG. 5B, the hidden states 562 are denoted $\hbar_i^{z-1}$ and the modified hidden states in the concatenations 564 are denoted $\hbar_i^z$, where z=1, ..., t. Thus, for the NLU model expansion 308a, the hidden states 562 would be denoted $\hbar_i^0$ and refer to the hidden states 512 produced by the NLU base model 306, and the modified hidden states in the concatenations 564 produced by the NLU model expansion 308a would be denoted $\hbar_i^1$. For the NLU model expansion 308b, the hidden states 562 would be denoted $\hbar h_i^1$ and refer to the modified hidden states in the concatenations 564 produced by the NLU model expansion 308a, and the modified hidden states in the concatenations 564 produced by the NLU model expansion 308b would be denoted $\hbar_i^2$. For the NLU model expansion 308t, the hidden states 562 would be denoted $\hbar_i^{t-1}$ and refer to the modified hidden states in the concatenations 564 produced by the NLU model expansion 308s, and the modified hidden states in the concatenations 564 produced by the NLU model expansion 308t would be denoted $\hbar_i^t$. The context vectors produced by the context-gated transfer layer 560 are denoted $c_i^z$. Since the concatenations 564 combine modified hidden states and context vectors, the concatenations 564 may be said to represent contextualized hidden states.

The context-gated transfer layer 560 operates to modify the initial hidden states 558 produced by the utterance encoding layer 556 based on the hidden states 562 produced by the immediately-preceding base model or model expansion. As a result, the modified hidden states in the concatenations 564 produced by the context-gated transfer layer 560 are affected by the hidden states 562 from the preceding model or model expansion, and the hidden states 562 can be used to transfer the semantic meaning of the whole utterance 502 from the preceding model or model expansion. One example implementation of the context-gated transfer layer 560 is described below. The concatenations 564 are provided to an output layer 566, which uses the concatenations 564 to produce a slot prediction 568 for each word 504 of the input utterance 502 and an intent prediction 570 for the whole utterance 502.

As noted above, parameters of the NLU base model 306 and parameters of each NLU model expansion 308a-308t are typically adjusted or tuned during training of that base model or model expansion. The parameters that could be modified may include weights or other values that are used to generate embedding vectors, hidden states, modified hidden states, slot predictions, and intent predictions. Also, as described above, the parameters of the NLU base model 306 can be fixed and are not modified during training of each NLU model expansion 308a-308t, and the parameters of each NLU model expansion 308a-308s can be fixed and are not modified during training of each subsequent NLU model expansion 308b-308t. In some embodiments, the parameters of the word embedding layer 552 in the NLU model expansion 308a may be initialized using the word embedding layer 506 of the NLU base model 306. Also, the parameters of the word embedding layer 552 in each NLU model expansion 308b-308t may be initialized using the word embedding layer 506 of the NLU base model 306 or using the word embedding layer 552 in the immediately-preceding NLU model expansion 308a-308s. For any new word to be included in one of the NLU model expansions 308a-308t, a word embedding for the new word in the word embedding layer 552 of the associated NLU model expansion 308a-308t may be initialized using a pretrained word embedding, such as by using the Global Vectors for word representation (denoted GloVe) embedding from Stanford University. If new words do not exist in the word embedding at all, such words can be trained from scratch. Additional details regarding training of the NLU model expansions 308a-308t are provided below.

Although FIGS. 5A and 5B illustrate examples of machine learning models supporting on-device lightweight NLU continual learning, various changes may be made to FIGS. 5A and 5B. For example, the number of words 504 in an input utterance 502 can vary, as would the associated number of embedding vectors, hidden states, modified hidden states, and slot predictions. Also, while multiple layers are shown in each of the machine learning models in FIGS. 5A and 5B, various layers may be combined or further subdivided, and additional layers may be added according to particular needs. As a specific example, the context-gated transfer layer 560 may be incorporated into or form a part of the utterance encoding layer 556.

Figures 6A, 6B:
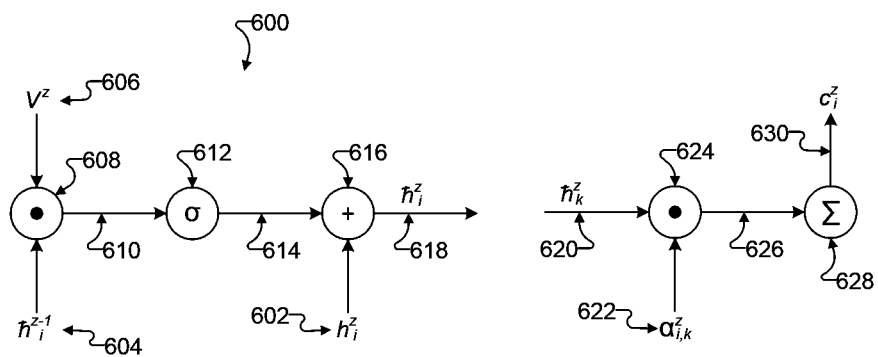
FIGS. 6A and 6B illustrate an example utterance context transfer mechanism used in models for on-device lightweight NLU continual learning in accordance with this disclosure.

FIGS. 6A and 6B illustrate an example utterance context transfer mechanism 600 used in models for on-device lightweight NLU continual learning in accordance with this disclosure. In particular, the utterance context transfer mechanism 600 in FIGS. 6A and 6B may be used in the context-gated transfer layer 560 of FIG. 5B to combine the hidden states 558 and 562 in each of the NLU model expansions 308a-308t. For ease of explanation, the utterance context transfer mechanism 600 shown in FIGS. 6A and 6B may be described as involving the use of the electronic device 101 in the network configuration 100 of FIG. 1. However, the utterance context transfer mechanism 600 may involve the use of any suitable devices in any suitable systems. Note that the same approach shown in FIGS. 6A and 6B may be used for each word 504 contained in an input utterance 502 being analyzed.

As shown in FIG. 6A, the utterance context transfer mechanism 600 receives a hidden state 602, which is denoted $h_i^z$ (meaning the hidden state 602 represents the initial hidden state 558 produced by the utterance encoding layer 556 for the $i^{th}$ word 504). The utterance context transfer mechanism 600 also receives a hidden state 604, which is denoted $\hbar_i^{z-1}$ (meaning the hidden state 604 represents the hidden state 562 for the $i^{th}$ word 504 received from the immediately-preceding base model or model expansion). The utterance context transfer mechanism 600 further applies a projection matrix 606, which is denoted $V^z$. A multiplication function 608 multiplies the hidden state 604 by the projection matrix 606 to produce a projected hidden state 610. The projection matrix 606 here is used to map the dimension of the hidden state 604 to the dimension of the hidden state 602, thereby projecting the hidden state 604 into the same dimensional space as the hidden state 602. A sigmoid function 612 is applied to the projected hidden state 610, where the sigmoid function 612 generally represents a type of S-shaped curve. The sigmoid function 612 essentially helps normalize the projected hidden state 610 by mapping the projected hidden state 610 into a known distribution, thereby producing a normalized hidden state 614. A summing function 616 combines the hidden state 602 and the normalized hidden state 614 to produce a modified hidden state 618, which is denoted $\hbar_i^z$ (meaning the modified hidden state 618 represents the hidden state produced by the context-gated transfer layer 560 for the $i^{th}$ word 504). Given this arrangement, the calculation of the modified hidden state 618 can be expressed as:

$$\hbar_i^z = h_i^z + \sigma(V^z \hbar_i^{z-1}) \quad (1)$$

[0086] As shown in FIG. 6B, a modified hidden state may be used to generate a context vector, which may be useful when providing "attention" as part of the NLU processing. The "attention" provides a combination of encoder states and the context vector. In this example, a modified hidden state 620 (denoted $\hbar_k^z$) is multiplied by a contextual matrix 622 using a multiplication function 624 to produce intermittent hidden states 626. Values of the contextual matrix 622 here are denoted $\alpha_{i,k}^z$, where the values identify a contextual influence of each word k in the utterance 502 on a specific word i in the utterance 502 (and again where z denotes the timestamp of the associated NLU model expansion). This essentially provides more contextual meaning of each word 504 in the utterance 502 in addition to the contextual meaning provided by the utterance encoding layer 556. The intermittent hidden states 626 for all k words are summed using a summing function 628, which produces a context vector 630 (denoted $c_i^z$) that represents the contextualized hidden state for the word i in the utterance 502. Given this arrangement, the calculation of the context vector 630 can be expressed as:

$$c_i^z = \Sigma_{k=1}^n \alpha_{i,k}^z \hbar_k^z \quad (2)$$

Here, n represents the total number of words in the utterance.

In this approach, $\alpha_i^t$ represents the contextual matrix 622 used to represent the attention on all n words 504 in the utterance 502. In some embodiments, $\alpha_i^t = \text{softmax}(\in_i)$, where $\in_i$ is an unnormalized contextual matrix before applying softmax for word i. Also, $\alpha_i^t$ can be fine-tuned based on $\alpha_i^0$, which represents a contextual matrix trained for the NLU base model 306. In particular embodiments, an initial contextual matrix can be expressed as:

$$\alpha_{i,j}^0 = \frac{\exp(\epsilon_{i,j}^0)}{\sum_{k=1}^T \exp(\epsilon_{i,k}^0)} \quad (3)$$

Here:

$$\in_{i,k}^0 = g^0(h_{i-1}^0 \oplus c_{i-1}^0, h_k) \quad (4)$$

may be learned from a feed-forward neural network $g^0$ associated with the NLU base model 306. Each NLU model expansion 308a-308t can have its own independent feed-forward neural network $g^z$, which can be initialized based on the feed-forward neural network $g^0$. As a result, $\alpha_i^z$ of can be fine-tuned from $\alpha_i^0$ during training of the NLU model expansion 308a-308t.

Although FIGS. 6A and 6B illustrate one example of an utterance context transfer mechanism 600 used in models for on-device lightweight NLU continual learning, various changes may be made to FIGS. 6A and 6B. For example, the specific approach described above represents one example way in which knowledge from a prior model structure can be incorporated into a subsequent model structure based on hidden states from the prior model structure. However, any other suitable approach for knowledge transfer may be used here.

As described above, the training of each NLU model expansion 308a-308t may occur to minimize one or more losses (errors) associated with the NLU model expansion 308a-308t. Each NLU model expansion 308a-308t is trained without modifying the parameters of the NLU base model 306, and each NLU model expansion 308b-308t is trained without modifying the parameters of any preceding NLU model expansions 308a-308s. In some embodiments, each NLU model expansion 308a-308t is trained while attempting to minimize an intent detection loss and a slot filling loss. The intent detection loss represents a measure of the errors by the NLU model expansion 308b-308t when identifying the intents of training utterances, and the slot filling loss represents a measure of the errors by the NLU model expansion 308b-308t when identifying and filling slots for the training utterances. In other words, the intent detection loss represents a measure of the errors in understanding the semantic meanings of the training utterances, and the slot filling loss represents a measure of the errors in understanding the semantic meaning of each word in the training utterances.

In some embodiments, the intent detection loss can be expressed as:

$$\mathcal{L}_I^z(\theta^z, \phi_{z-1}^z) \triangleq -\Sigma_{i=1}^{|I|} I(i) \log P_I^z(i) \quad (5)$$

Also, in some embodiments, the slot filling loss can be expressed as:

$$\mathcal{L}_S^z(\theta^z, \phi_{z-1}^z) \triangleq \frac{1}{n} \sum_{j=1}^{|S|} \sum_{i=1}^{n} y(i,j) \log P_S^z(i,j) \quad (6)$$

Here, $P_I^z(i)$ represents the probability from the NLU model expansion 308b-308t being trained at timestamp z that a training utterance belongs to intent i, and $P_S^z(i,j)$ represents the probability from the NLU model expansion 308b-308t being trained at timestamp z that the $i^{th}$ word in the training utterance belongs to slot j. In some cases, both of these values can be based on the softmax functions used by the output layer 556 of the NLU model expansion 308b-308t to produce slot and intent predictions. Also, I(i) represents the ground truth intent data for the training utterance (meaning it represents the correct intent of the training utterance), and y(i,j) represents the ground truth slot data for the training utterance (meaning it represents the correct slot filling for the training utterance). Further, n represents the length of the training utterance, and S represents the set of all possible slot types. In some cases, the intent vector I(i) may have a value of "1" in the position associated with the correct intent and values of "0" in all other positions that are associated with incorrect intents. During training, the parameters $\theta^z$ and $\phi_{z-1}^z$ of the NLU model expansion 308b-308t being trained can be adjusted to try and minimize these loss functions. The parameters $\theta^z$ can include weights used in the word embedding layer 552 of the NLU model expansion, weights used in the utterance encoder layer 556 of the NLU model expansion, and weights used in the output layer 566 of the NLU model expansion. The parameters $\phi_{z-1}^z$ can include weights contained in $V^z$ and $\alpha_{i,k}^z$ used in the context-gated transfer layer 560 of the NLU model expansion.

Once at least one NLU model expansion 308a-308t has been trained and put into use, the expandable inference engine 316 can use at least one output 324a-324t from the at least one NLU model expansion 308a-308t when analyzing each input utterance 318 and producing the associated NLU-based output 320. In some embodiments, when at least one NLU model expansion 308a-308t has been trained, the expandable inference engine 316 can generate the NLU-based output 320 for each input utterance 318 by combining the output 324 of the NLU base model 306 with the output(s) 324a-324t of the at least one NLU model expansion 308a-308t. In particular embodiments, each NLU-based output 320 associated with an input utterance 318 can be generated by the expandable inference engine 316 as:

$$\Sigma_{k=0}^{t} P^k(i) I^k(i) \qquad (7)$$

where $P^k(i)$ is an identified label (which is contained in the output 324, 324a-324t from $M^k$) and $I^k(i)$ is an indicator function that has a value of "1" when the $i^{th}$ word is in the vocabulary of $M^k$ and a value of "0" otherwise. Given this, the label with the maximum probability can be selected by the inference engine 316 for inclusion in the output 320.

Figure 7:
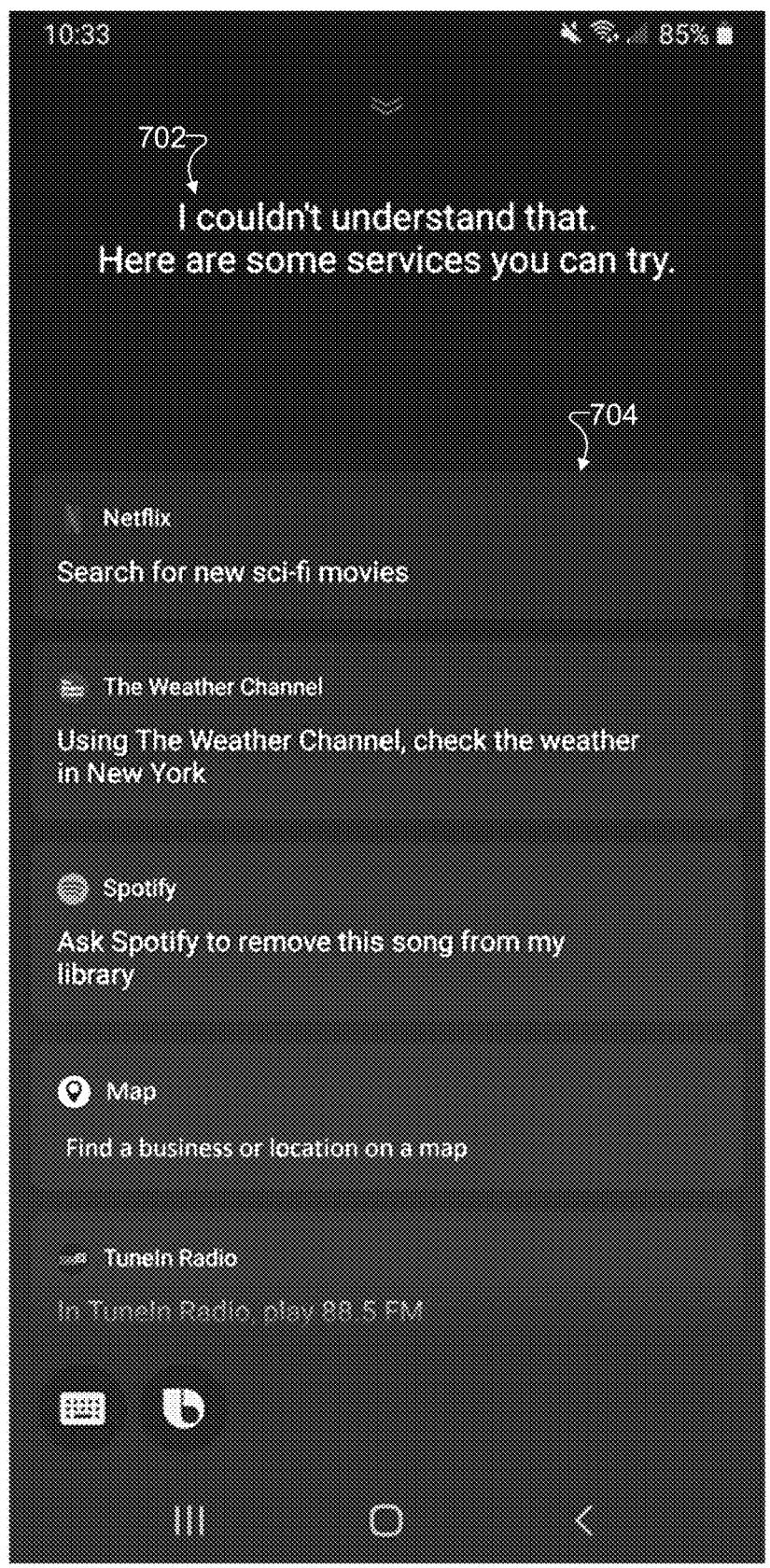
FIG. 7 illustrates an example graphical user interface for collecting information used in on-device lightweight NLU continual learning in accordance with this disclosure.

As noted above, in some embodiments, the training data that is used to train at least one NLU model expansion 308a-308t may be collected by an electronic device 101 based on interactions with a user of the electronic device 101. Various techniques may be used to obtain data for use in training at least one NLU model expansion 308a-308t. FIG. 7 illustrates an example graphical user interface 700 for collecting information used in on-device lightweight NLU continual learning in accordance with this disclosure. For ease of explanation, the graphical user interface 700 shown in FIG. 7 may be described as involving the use of the server 106 and the electronic device 101 in the network configuration 100 of FIG. 1. The graphical user interface 700 may, for example, be presented on the display 160 of the electronic device 101 after the user submits an utterance and the electronic device 101 determines that the meaning of the utterance cannot be understood. However, the graphical user interface 700 may involve the use of any suitable devices in any suitable systems.

As shown in FIG. 7, in response to a user utterance that cannot be understood, the electronic device 101 can provide a notification 702 indicating that the user utterance is not understood and requesting possible input from the user. The electronic device 101 also provides the user with a list 704 of possible actions that can be taken to implement the user utterance. The options provided in the list 704 may be based at least partially on whatever meaning the electronic device 101 was able to identify about the user utterance (if any). The user may select one of the options in the list 704 and perform a particular action, and the electronic device 101 may track the user's actions in order to derive the intent and one or more slots of the user utterance. The derived intent and slot filling(s) may then be stored as the ground truth label for this user utterance, and the combination of the user utterance and the ground truth label may be used as part of training data 312a-312t for one of the NLU model expansions 308a-308t.

As an example of this functionality, assume a user provides an utterance of "what is there to do, entertainment wise, nearby?" to the electronic device 101, but the electronic device 101 is unable to understand the meaning of the utterance. The electronic device 101 may provide the notification 702 to the user along with a list 704 of possible options. If the user clicks on a "map" option in the list 704 and enters "entertainment" as a search term in a map application, the electronic device 101 may learn that the intent of the utterance was "map search" and that a "business type" slot related to the utterance was "entertainment." This information may then be used as a ground truth label for this utterance, and the utterance and ground truth label can be used during the subsequent training of an NLU model expansion.

Note that while this represents a simplified example of data collection functionality to support model expansion training, more advanced interactions may also occur with the user. For example, a user may be allowed to identify specific slot types for terms used in the user's utterances. Also note that while this example shows interactions occurring via the display 160 of the electronic device 101, other types of interactions (such as voice interactions) involving a user may occur. In addition, a series of interactions involving a user may occur, which may allow the electronic device 101 to identify a sequence of actions that can be associated with a user utterance.

Although FIG. 7 illustrates one example of a graphical user interface 700 for collecting information used in on-device lightweight NLU continual learning, various changes may be made to FIG. 7. For example, any other suitable graphical or non-graphical interface may be used to obtain information used for training an NLU model expansion.

Figure 8:
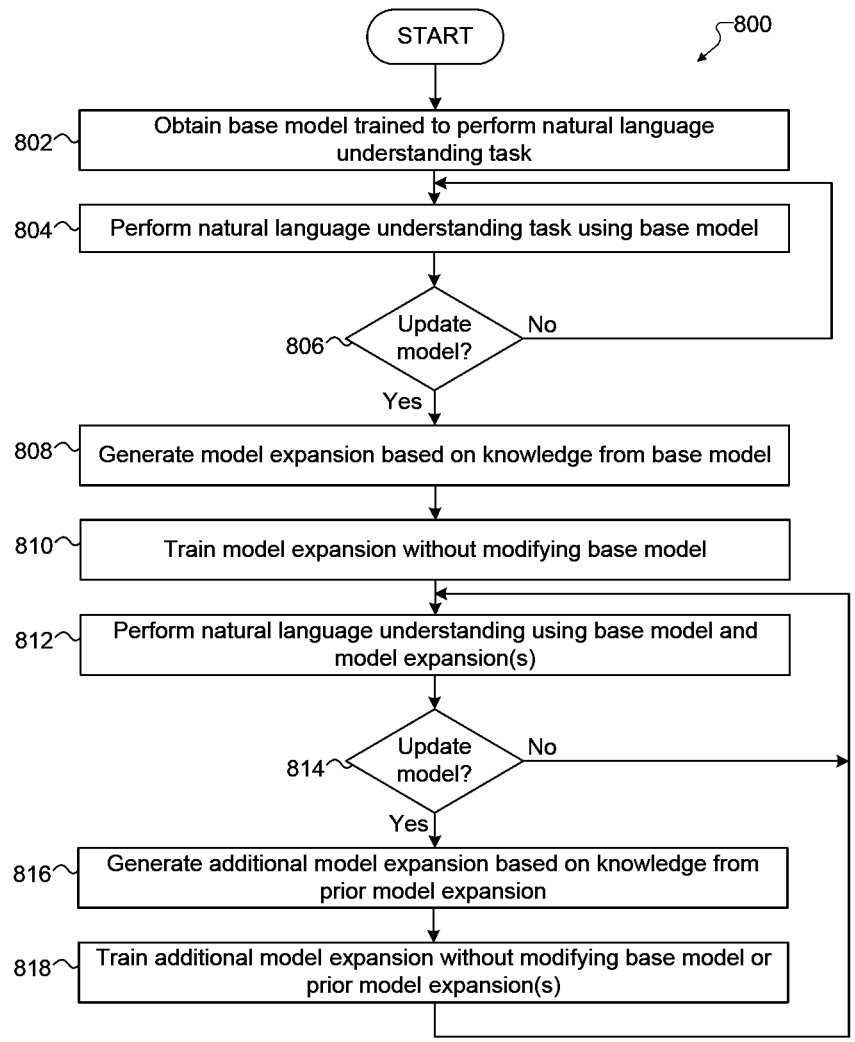
FIG. 8 illustrates an example method for on-device lightweight NLU continual learning in accordance with this disclosure.

FIG. 8 illustrates an example method 800 for on-device lightweight NLU continual learning in accordance with this disclosure. For ease of explanation, the method 800 shown in FIG. 8 may be described as involving the use of the server 106 and the electronic device 101 in the network configuration 100 of FIG. 1. However, the method 800 may involve the use of any suitable devices in any suitable systems.

As shown in FIG. 8, a base model that has been trained to perform at least one natural language understanding task is obtained at step 802. This may include, for example, the electronic device 101 obtaining a trained NLU base model 306 from the server 106. The at least one natural language understanding task is performed using the base model at step 804. This may include, for example, the inference engine 316 of the electronic device 101 using the NLU base model 306 to identify slot and intent predictions in NLU-based outputs 320 associated with input utterances 318. If no model update is needed at step 806, the electronic device 101 can continue using the NLU base model 306 to perform the natural language understanding task(s).

At some point, a determination is made to update the model at step 806, and a model expansion based on knowledge from the base model is generated at step 808 and trained without modifying parameters of the base model at step 810. This may include, for example, the electronic device 101 collecting information indicating that various prior utterances obtained by the electronic device 101 were not understood or not understood correctly, along with information identifying how those prior utterances should have been interpreted. This may also include the electronic device 101 configuring a word embedding layer 552, an utterance encoder layer 556, a context-gated transfer layer 560, and an output layer 566 for an NLU model expansion 308a. This may further include the electronic device 101 using training data that includes the prior utterances and their associated ground truth labels to adjust weights in the word embedding layer 552, utterance encoder layer 556, context-gated transfer layer 560, and/or output layer 566 of the NLU model expansion 308a as needed. The context-gated transfer layer 560 here operates based on hidden states 310, 512 produced by the NLU base model 306, thereby incorporating knowledge from the NLU base model 306 into the NLU model expansion 308a. The at least one natural language understanding task is performed using the base model and the one existing model expansion at step 812.

This may include, for example, the inference engine 316 of the electronic device 101 using the NLU base model 306 and the NLU model expansion 308a to identify slot and intent predictions in NLU-based outputs 320 associated with input utterances 318. If no model update is needed at step 814, the electronic device 101 can continue using the NLU base model 306 and the NLU model expansion 308a to perform the natural language understanding task(s).

At some other point, a determination is made to update the model at step 814, and an additional model expansion based on knowledge from the preceding model expansion is generated at step 816 and trained without modifying parameters of the base model and the preceding model expansion at step 818. This may include, for example, the electronic device 101 collecting additional information indicating that other various prior utterances obtained by the electronic device 101 were not understood or not understood correctly, along with information identifying how those prior utterances should have been interpreted. This may also include the electronic device 101 configuring a word embedding layer 552, an utterance encoder layer 556, a context-gated transfer layer 560, and an output layer 566 for an NLU model expansion 308b. This may further include the electronic device 101 using training data that includes the prior utterances and their associated ground truth labels to adjust weights in the word embedding layer 552, utterance encoder layer 556, context-gated transfer layer 560, and/or output layer 566 of the NLU model expansion 308b as needed. The context-gated transfer layer 560 here operates based on the hidden states 310 produced by the immediately-preceding NLU model expansion 308a, thereby incorporating knowledge from the NLU model expansion 308a into the NLU model expansion 308b. The process then returns to step 812 to perform the at least one natural language understanding task using the base model and the two existing model expansions. This may include, for example, the inference engine 316 of the electronic device 101 using the NLU base model 306 and the NLU model expansions 308a-308b to identify slot and intent predictions in NLU-based outputs 320 associated with input utterances 318. This process can repeat steps 812-818 to produce more NLU model expansions (and possibly numerous NLU model expansions) as needed or desired.

Although FIG. 8 illustrates one example of a method 800 for on-device lightweight NLU continual learning, various changes may be made to FIG. 8. For example, while shown as a series of steps, various steps in FIG. 8 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
obtaining, using at least one processor of an electronic device, a base model trained to perform natural language understanding;
generating, using the at least one processor, a first model expansion based on knowledge from the base model;
training, using the at least one processor, the first model expansion based on first utterances without modifying parameters of the base model;
receiving, using the at least one processor, an additional utterance from a user; and
determining, using the at least one processor, a meaning of the additional utterance using the base model and the first model expansion;
wherein the first model expansion is configured to (i) receive first hidden states generated by the base model, (ii) generate second hidden states, and (iii) use combinations of the first and second hidden states to determining the meaning of the additional utterance.

2. The method of claim 1, further comprising:
generating, using the at least one processor, a second model expansion based on knowledge from the first model expansion; and
training, using the at least one processor, the second model expansion based on second utterances without modifying the parameters of the base model and without modifying parameters of the first model expansion;
wherein determining the meaning of the additional utterance comprises determining the meaning of the additional utterance using the base model, the first model expansion, and the second model expansion.

3. The method of claim 2, wherein the first and second utterances are obtained from the user.

4. The method of claim 1, wherein determining the meaning of the additional utterance comprises combining slot prediction and intent prediction outputs of the base model with slot prediction and intent prediction outputs of the first model expansion to generate one or more slot predictions and an intent prediction associated with the additional utterance.

5. The method of claim 1, wherein generating the first model expansion based on the knowledge from the base model comprises incorporating the first hidden states generated by the base model into the first model expansion.

6. The method of claim 1, wherein:
the base model is configured to generate first vector embeddings, generate the first hidden states based on the first vector embeddings, and generate first slot predictions and a first intent prediction based on the first hidden states; and
the first model expansion is configured to generate second vector embeddings, generate the second hidden states based on the second vector embeddings, generate context vectors based on the combinations of the first and second hidden states, and generate second slot predictions and a second intent prediction based on the context vectors.

7. A method comprising:
obtaining, using at least one processor of an electronic device, a base model trained to perform natural language understanding;
generating, using the at least one processor, a first model expansion based on knowledge from the base model;
training, using the at least one processor, the first model expansion based on first utterances without modifying parameters of the base model;
receiving, using the at least one processor, an additional utterance from a user; and
determining, using the at least one processor, a meaning of the additional utterance using the base model and the first model expansion;
wherein generating the first model expansion based on the knowledge from the base model comprises incorporating hidden states produced by the base model into the first model expansion;
wherein a specific one of the hidden states produced by the base model is associated with a specific word in an utterance; and wherein incorporating the specific hidden state produced by the base model into the first model expansion comprises:
combining a projected and normalized version of the specific hidden state produced by the base model with a hidden state produced by the first model expansion to produce a modified hidden state; and
generating a context vector based on the modified hidden state.

8. An electronic device comprising:
at least one memory configured to store a base model trained to perform natural language understanding; and
at least one processor configured to:
generate a first model expansion based on knowledge from the base model;
train the first model expansion based on first utterances without modifying parameters of the base model;
receive an additional utterance from a user; and
determine a meaning of the additional utterance using the base model and the first model expansion;
wherein the first model expansion is configured to (i) receive first hidden states generated by the base model, (ii) generate second hidden states, and (iii) use combinations of the first and second hidden states to determining the meaning of the additional utterance.

9. The electronic device of claim 8, wherein the at least one processor is further configured to:
generate a second model expansion based on knowledge from the first model expansion; and
train the second model expansion based on second utterances without modifying the parameters of the base model and without modifying parameters of the first model expansion; and
wherein the at least one processor is configured to determine the meaning of the additional utterance using the base model, the first model expansion, and the second model expansion.

10. The electronic device of claim 9, wherein the at least one processor is further configured to obtain the first and second utterances from the user.

11. The electronic device of claim 8, wherein, to determine the meaning of the additional utterance, the at least one processor is configured to combine slot prediction and intent prediction outputs of the base model with slot prediction and intent prediction outputs of the first model expansion to generate one or more slot predictions and an intent prediction associated with the additional utterance.

12. The electronic device of claim 8, wherein, to generate the first model expansion based on the knowledge from the base model, the at least one processor is configured to incorporate the first hidden states generated by the base model into the first model expansion.

13. The electronic device of claim 8, wherein:
the base model is configured to generate first vector embeddings, generate the first hidden states based on the first vector embeddings, and generate first slot predictions and a first intent prediction based on the first hidden states; and
the first model expansion is configured to generate second vector embeddings, generate the second hidden states based on the second vector embeddings, generate context vectors based on the combinations of the first and second hidden states, and generate second slot predictions and a second intent prediction based on the context vectors.

14. An electronic device comprising:
at least one memory configured to store a base model trained to perform natural language understanding; and
at least one processor configured to:
generate a first model expansion based on knowledge from the base model;
train the first model expansion based on first utterances without modifying parameters of the base model;
receive an additional utterance from a user; and
determine a meaning of the additional utterance using the base model and the first model expansion;
wherein, to generate the first model expansion based on the knowledge from the base model, the at least one processor is configured to incorporate hidden states produced by the base model into the first model expansion;
wherein a specific one of the hidden states produced by the base model is associated with a specific word in an utterance; and
wherein, to incorporate the specific hidden state produced by the base model into the first model expansion, the at least one processor is configured to:
combine a projected and normalized version of the specific hidden state produced by the base model with a hidden state produced by the first model expansion to produce a modified hidden state; and
generate a context vector based on the modified hidden state.

15. A non-transitory computer readable medium containing instructions that when executed cause at least one processor to:
obtain a base model trained to perform natural language understanding;
generate a first model expansion based on knowledge from the base model;
train the first model expansion based on first utterances without modifying parameters of the base model;
receive an additional utterance from a user; and
determine a meaning of the additional utterance using the base model and the first model expansion;
wherein the first model expansion is configured to (i) receive first hidden states generated by the base model, (ii) generate second hidden states, and (iii) use combinations of the first and second hidden states to determining the meaning of the additional utterance.

16. The non-transitory computer readable medium of claim 15, further containing instructions that when executed cause the at least one processor to:
generate a second model expansion based on knowledge from the first model expansion; and
train the second model expansion based on second utterances without modifying the parameters of the base model and without modifying parameters of the first model expansion;
wherein the instructions that when executed cause the at least one processor to determine the meaning of the additional utterance comprise:
instructions that when executed cause the at least one processor to determine the meaning of the additional utterance using the base model, the first model expansion, and the second model expansion.

17. The non-transitory computer readable medium of claim 15, wherein the instructions that when executed cause the at least one processor to determine the meaning of the additional utterance comprise:
instructions that when executed cause the at least one processor to combine slot prediction and intent prediction outputs of the base model with slot prediction and intent prediction outputs of the first model expansion to generate one or more slot predictions and an intent prediction associated with the additional utterance.

18. The non-transitory computer readable medium of claim 15, wherein the instructions that when executed cause the at least one processor to generate the first model expansion based on the knowledge from the base model comprise:
instructions that when executed cause the at least one processor to incorporate the first hidden states generated by the base model into the first model expansion.

19. The non-transitory computer readable medium of claim 15, wherein:
the base model is configured to generate first vector embeddings, generate the first hidden states based on the first vector embeddings, and generate first slot predictions and a first intent prediction based on the first hidden states; and
the first model expansion is configured to generate second vector embeddings, generate the second hidden states based on the second vector embeddings, generate context vectors based on the combinations of the first and second hidden states, and generate second slot predictions and a second intent prediction based on the context vectors.

20. A non-transitory computer readable medium containing instructions that when executed cause at least one processor to:
obtain a base model trained to perform natural language understanding;
generate a first model expansion based on knowledge from the base model;
train the first model expansion based on first utterances without modifying parameters of the base model;
receive an additional utterance from a user; and
determine a meaning of the additional utterance using the base model and the first model expansion;
wherein the instructions that when executed cause the at least one processor to generate the first model expansion based on the knowledge from the base model comprise instructions that when executed cause the at least one processor to incorporate hidden states produced by the base model into the first model expansion;
wherein a specific one of the hidden states produced by the base model is associated with a specific word in an utterance; and
wherein the instructions that when executed cause the at least one processor to incorporate the specific hidden state produced by the base model into the first model expansion comprise instructions that when executed cause the at least one processor to:
combine a projected and normalized version of the specific hidden state produced by the base model with a hidden state produced by the first model expansion to produce a modified hidden state; and
generate a context vector based on the modified hidden state.

* * * * *